United States Patent [19]

Hill

[11] 3,970,239

[45] July 20, 1976

[54] FLUXING TECHNIQUE FOR REMOVING LEAD OXIDE

[75] Inventor: Michael Hill, Tarrytown, N.Y.

[73] Assignee: General Instrument Corporation, Clifton, N.J.

[22] Filed: Aug. 14, 1975

[21] Appl. No.: 604,723

[52] U.S. Cl. .............................. 228/220; 228/223; 148/23; 228/263
[51] Int. Cl.² ..................................... B23K 35/362
[58] Field of Search ............. 148/23; 228/220, 223, 228/180 A, 219, 263

[56] References Cited
UNITED STATES PATENTS

| | | | |
|---|---|---|---|
| 3,058,210 | 10/1962 | Winters | 228/220 X |
| 3,099,590 | 7/1963 | Laudenslager | 148/23 |
| 3,412,113 | 11/1968 | Fitch et al. | 148/23 X |
| 3,665,590 | 5/1972 | Percival | 228/180 A |
| 3,754,698 | 8/1973 | Bochinski et al. | 228/220 X |

Primary Examiner—Al Lawrence Smith
Assistant Examiner—K. J. Ramsey

[57] ABSTRACT

A process for removing lead oxide from the surface of the lead solder of a semiconductor assembly in the inert atmosphere of a joining furnace by introducing into the joining furnace an acetate compound capable of reacting with lead oxide at the joining furnace temperature to form a coordinated lead compound. Both the acetate compound and the coordinated lead compound are gases at the joining furnace temperature. The acetate compound is preferably glacial acetic acid, acetic anhydride, or mixtures thereof.

8 Claims, No Drawings

FLUXING TECHNIQUE FOR REMOVING LEAD OXIDE

BACKGROUND OF THE INVENTION

The present invention relates to a process for removing lead oxide from the surface of the lead solder of a semiconductor assembly, and, more particularly, for a process for accomplishing the same in the inert atmosphere of a joining furnace.

One conventional technique for attaching a lead to a semiconductor chip involves the use of a tin/lead solder, the typical 60/40 tin/lead solder forming a eutectic having a melting point of 182°C. Conventional fluxing agents, such as rosin flux, which leave a surface film which must be removed (for example, by rubbing with alcohol) before soldering or which contain ingredients deleterious to the semiconductor chip, are obviously to be avoided. As described in U.S. Pat. No. 3,665,590, hot hydrogen reducing gas may be used to combine with the tin oxide and lead oxide of a surface oxidized tin/lead solder to form water vapor and melted and purified tin/lead solder. However, the formation of water vapor, formed either through reaction of the hydrogen with the oxide impurities or through burning of the hydrogen, adjacent to solder surface is clearly undesirable.

In order to obtain solder bonds of great strength and thus more capable of resisting the rough treatment to which the semiconductor devices are often subjected, it has been proposed to use a lead solder which forms a bond of greater physical strength than a tin/lead solder. A typical lead solder may consist exclusively of lead, or include a small amount of calcium (typically about 0.08% by weight), antimony (typically about 8–10% by weight) or other metals for additional strength. As pure lead has a melting point of 327°C, the lead solder bonds are not only stronger, but capable of withstanding higher temperatures than conventional tin/lead solders. A further advantage of the lead solder is that it is a relatively soft material capable of accommodating the differences in thermal expansion coefficients between typical semiconductor materials, such as silicon, and typical lead materials, such as silver and aluminum. On the other hand, the absence of tin from the solder aggravates to a substantial degree the problem caused by the presence of lead oxide on the surface of the lead solder. Indeed, removal of lead oxide from a lead solder surface with hydrogen gas would require temperatures in the range of 800°C.

Accordingly, it is an object of the present invention to provide a process for removing lead oxide from the surface of the lead solder of a semiconductor assembly in the inert atmosphere of a joining furnace by a process which does not require manual removal of the flux or its reaction products from the solder surface.

It is another object to provide such a process which operates at temperatures well below 800°C.

SUMMARY OF THE INVENTION

It has now been found that the above and related objects of the present invention are attained by introducing into the inert atmosphere of a joining furnace an acetate compound capable of reacting with the lead oxide on the lead solder surface at the joining furnace temperature to form a coordinated lead compound. The acetate compound is selected so that both it and the coordinated lead compound are gases as the joining furnace temperature. The acetate compound is preferably selected from the group consisting of glacial acetic acid, acetic anhydride, and mixtures thereof.

The joining furnace atmosphere is preferably maintained at a temperature of at least 328°C, and preferably about 328°–420°C.

DESCRIPTION OF THE PREFERRED EMBODIMENTS

The acetate compound used in the process of the present invention must be a gas at the temperature of the joining furnace atmosphere and must react with a lead oxide at the temperature of the joining furnace to form one or more coordinated lead compounds which in turn are gases at the temperature of the joining furnace. The acetate compound may be introduced into the joining furnace in either solid, liquid or gaseous form, but if introduced as an aqueous solution, the concentration of the acetate compound in the solution must be very high to avoid the adverse effects resulting from the introduction of a significant quantity of water vapor into the inert atmosphere of the joining furnace. Thus, the preferred acetate compounds are glacial acetic acid (concentration 95.5% by weight), acetic anhydride, and mixtures thereof. The acetate compound may be either injected directly into the joining furnace atmosphere, or indirectly introduced with the inert gas used to provide the inert atmosphere of the joining furnace, for example, by bubbling the inert gas through a bubbler containing a liquid acetate compound, by subliming a solid acetate compound under vacuum and introducing the vapor into the insert gas stream, etc.

The quantity of the acetate compound which must be introduced into the inert atmosphere to provide complete removal of the lead oxide will, of course, depend upon the type of acetate compound, the quantity and types of lead oxide, and especially the temperature of the joining furnace, and the duration of the lead oxide exposure to the acetate compound. However, it is well within the capacity of one skilled in the art to select an initial acetate compound concentration in the inert atmosphere and to adjust this concentration up and down as required to effect complete removal of lead oxide from the lead solder surface utilizing a minimum of the acetate compound.

During the fluxing process, the temperature in the joining furance is maintained at the conventional lead soldering temperature, generally at least 328°C, and preferably 328°–420°C. Higher temperatures may be employed, provided that the coordinated lead compounds are stable at the higher temperatures and do not undergo decomposition with the formation of lead oxide. Optimally, a steady stream of the inert atmosphere into and out of the joining furnace is maintained, with fresh acetate compound being introduced with the input stream and the coordinated lead compound being removed with the output stream. While the atmosphere of the joining furnace has been described as inert, small amounts of impurities therein (for example, up to 1% by volume of air) may be present as a practical matter.

While the mechanism of the present invention is not completely understood, it is postulated that the various forms of lead oxide present on the surface of the lead solder react with the acetate compound at the temperature of the joining furnace to form one or more coordinated lead compounds, such as tetraethyl lead, which are gases at the joining furnace temperature. This leaves a clean solder surface available to readily wet the materials being soldered.

In a typical process utilizing the principles of the present invention, a jig, containing an assembly of a semiconductor, lead solder preform, and lead members, is passed through a preheated conventional five chamber joining furnace. The center chamber has an inert atmosphere containing the acetate compound vapor, while the surrounding chambers merely have the inert atmosphere. Exposure of the lead oxide for about 2–3 minutes in the center chamber at a joining furnace temperature of about 328°C is sufficient to effect the reaction and vaporization of the reaction products as well as the desired soldering.

Typically the semiconductor is a silicon chip containing small quantities of dopants, and the lead members are formed of silver, aluminum or other electrically conductive metals. The lead preform is essentially formed of lead, although small quantities of additional materials may also be present, such as up to 0.08% by weight of calcium or up to 10% by weight of antimony, to further enhance the mechanical strength of the joint.

Now that the preferred embodiments of the present invention have been described in detail, various modifications and improvements thereon will become readily apparent to those skilled in the art. Accordingly, the spirit and scope of the present invention is to be limited only by the appended claims, not by the foregoing disclosure.

I claim:

1. A process for removing lead oxide from the surface of the lead solder of a semiconductor assembly in the inert atmosphere of a joining furnace comprising the step of:
   introducing into said joining furnace an acetate compound, said acetate compound being capable of reacting with said lead oxide at the temperature of said joining furnace to form at least one coordinated lead compound, said acetate compound and said coordinated lead compound both being gases at said joining furnace temperature.

2. The process of claim 1 wherein said acetate compound is glacial acetic acid.

3. The process of claim 1 wherein said acetate compound is acetic anhydride.

4. The process of claim 1 including the additional step of maintaining said joining furnace atmosphere at a temperature of at least 328°C.

5. The process of claim 1 including the additional step of maintaining said joining furnace atmosphere at a temperature of about 328°–420°C.

6. The process of claim 1 wherein said acetate compound is selected from the group consisting of glacial acetic acid, acetic anhydride, and mixtures thereof, and wherein said joining furnace temperature is maintained at about 328°–420°C.

7. The process of claim 1 wherein said acetate compound is introduced directly into said joining furnace atmosphere.

8. The process of claim 1 wherein said acetate compound is introduced into said joining furnace atmosphere along with said inert atmosphere.

* * * * *